United States Patent [19]
Sadri et al.

[11] Patent Number: 5,651,649
[45] Date of Patent: Jul. 29, 1997

[54] HIGH STRENGTH TORQUE TYPE BLIND BOLT WITH ANTI-ROTATION

[75] Inventors: Shahriar M. Sadri, San Clemente; Mark R. Plunkett, Irvine; Marvin R. Hicks, Riverside, all of Calif.

[73] Assignee: Huck International, Inc., Irvine, Calif.

[21] Appl. No.: 499,361

[22] Filed: Jul. 7, 1995

Related U.S. Application Data

[63] Continuation-in-part of Ser. No. 317,293, Oct. 3, 1994.

[51] Int. Cl.$^6$ ...................................................... F16B 13/04
[52] U.S. Cl. ............................... 411/34; 411/49; 411/55; 411/37
[58] Field of Search .......................... 411/34–43, 3, 411/5, 55, 49

[56] References Cited

U.S. PATENT DOCUMENTS

| | | |
|---|---|---|
| 2,061,628 | 11/1936 | Huck . |
| 2,061,629 | 11/1936 | Huck . |
| 2,099,678 | 11/1937 | Curtis . |
| 2,114,493 | 4/1938 | Huck . |
| 2,282,711 | 5/1942 | Eklund . |
| 2,324,142 | 7/1943 | Beklund ................................. 411/35 |
| 2,527,307 | 10/1950 | Huck . |
| 2,765,699 | 10/1956 | LaTorre . |
| 2,795,989 | 6/1957 | Koenig . |
| 2,887,003 | 5/1959 | Brilmyer . |
| 2,905,045 | 9/1959 | Vance . |
| 2,959,999 | 11/1960 | Wing . |
| 3,107,572 | 10/1963 | Orloff . |
| 3,129,630 | 4/1964 | Wing et al. . |
| 3,136,204 | 6/1964 | Reynolds . |
| 3,202,036 | 8/1965 | Simko . |
| 3,222,977 | 12/1965 | Vaughn . |
| 3,236,143 | 2/1966 | Wing . |
| 3,253,495 | 5/1966 | Orloff . |
| 3,262,353 | 7/1966 | Waeltz et al. . |
| 3,277,771 | 10/1966 | Reynolds . |
| 3,311,147 | 3/1967 | Walker . |
| 3,345,900 | 10/1967 | Villo . |
| 3,377,907 | 4/1968 | Hurd . |
| 3,473,431 | 10/1969 | King, Jr. . |
| 3,515,028 | 6/1970 | Patton . |
| 3,524,489 | 8/1970 | King, Jr. . |
| 3,643,544 | 2/1972 | Massa . |
| 3,657,956 | 4/1972 | Bradley et al. . |
| 3,698,278 | 10/1972 | Trembley . |

(List continued on next page.)

FOREIGN PATENT DOCUMENTS

| | | |
|---|---|---|
| 1300950 | 7/1962 | France . |
| 2652395 | 3/1991 | France . |
| 2016106 | 9/1979 | United Kingdom . |

OTHER PUBLICATIONS

The Huck BOM® Fastening System, High strength blind fasteners for structural applications, ©1987 Huck Manufacturing Company.

Tau Bolt® Fastener, Carbon Steel 3BL, Huck Manufacturing Company.

Tau Bolt® Fastener, Alloy Steel BL, Huck Manufacturing Company.

*Primary Examiner*—Flemming Saether
*Attorney, Agent, or Firm*—Harness, Dickey & Pierce, P.L.C.

[57] ABSTRACT

In general a torque controlled blind bolt for securing workpieces is shown and which blind bolt has a core pin with a blind side head and a plurality of threads and a nut adapted to be threaded onto the pin threads; the blind bolt which has a main sleeve structure and an expandable blind side sleeve structure is set by torque applied between the pin and nut which causes the expandable sleeve to be expanded by the pin head and to thereby form a load bearing blind head; the blind fastener includes a grip adjuster structure which defines a cavity having a depth selected to define the grip range of the fastener with the grip cavity generally located externally of the workpieces; an anti-rotation structure is formed between the pin head and the expandable sleeve structure to inhibit relative rotation in response to the torque applied between the nut and the pin.

11 Claims, 4 Drawing Sheets

U.S. PATENT DOCUMENTS

| | | |
|---|---|---|
| 3,786,612 | 1/1974 | Baker . |
| 3,835,615 | 9/1974 | King, Jr. . |
| 3,878,760 | 4/1975 | Jeal et al. . |
| 3,965,792 | 6/1976 | King, Jr. . |
| 4,012,984 | 3/1977 | Matuschek . |
| 4,077,299 | 3/1978 | King, Jr. . |
| 4,089,247 | 5/1978 | Dahl et al. . |
| 4,157,675 | 6/1979 | King, Jr. . |
| 4,168,650 | 9/1979 | Dahl et al. . |
| 4,203,346 | 5/1980 | Hall et al. . |
| 4,260,005 | 4/1981 | Stencel . |
| 4,289,060 | 9/1981 | Emmett . |
| 4,289,061 | 9/1981 | Emmett . |
| 4,293,259 | 10/1981 | Liebig . |
| 4,312,613 | 1/1982 | Binns . |
| 4,364,697 | 12/1982 | Binns . |
| 4,370,081 | 1/1983 | Briles . |
| 4,376,604 | 3/1983 | Pratt . |
| 4,383,353 | 5/1983 | Stencel . |
| 4,451,189 | 5/1984 | Pratt . |
| 4,457,652 | 7/1984 | Pratt . |
| 4,521,147 | 6/1985 | King, Jr. . |
| 4,526,372 | 7/1985 | Kendall ........................... 411/38 |
| 4,544,312 | 10/1985 | Stencel . |
| 4,579,491 | 4/1986 | Kull . |
| 4,580,936 | 4/1986 | Finncis ........................... 411/38 |
| 4,601,623 | 7/1986 | Wallace . |
| 4,627,775 | 12/1986 | Dixon . |
| 4,659,271 | 4/1987 | Pratt . |
| 4,659,272 | 4/1987 | Pratt . |
| 4,699,552 | 10/1987 | Jeal . |
| 4,742,735 | 5/1988 | Stencel . |
| 4,752,169 | 6/1988 | Pratt . |
| 4,765,787 | 8/1988 | Briles ........................... 411/41 |
| 4,772,167 | 9/1988 | Beals . |
| 4,813,834 | 3/1989 | Smith . |
| 4,815,906 | 3/1989 | Binns . |
| 4,832,548 | 5/1989 | Strobel . |
| 4,865,499 | 9/1989 | Lacey . |
| 4,867,625 | 9/1989 | Dixon . |
| 4,877,363 | 10/1989 | Williamson et al. . |
| 4,900,205 | 2/1990 | Sadri . |
| 4,919,577 | 4/1990 | Binns . |
| 4,921,384 | 5/1990 | Nordyke . |
| 4,950,115 | 8/1990 | Sadri . |
| 4,979,857 | 12/1990 | Wing ........................... 411/5 |
| 5,006,024 | 4/1991 | Siebol . |
| 5,090,852 | 2/1992 | Dixon . |
| 5,108,238 | 4/1992 | Ewing . |
| 5,135,340 | 8/1992 | Stinson . |
| 5,178,502 | 1/1993 | Sadri . |
| 5,213,460 | 5/1993 | Sadri et al. . |
| 5,248,231 | 9/1993 | Denham ........................... 411/38 |
| 5,252,014 | 10/1993 | Andrews . |
| 5,259,713 | 11/1993 | Rener et al. . |
| 5,263,804 | 11/1993 | Ernst et al. . |
| 5,267,423 | 12/1993 | Giannuzzi . |

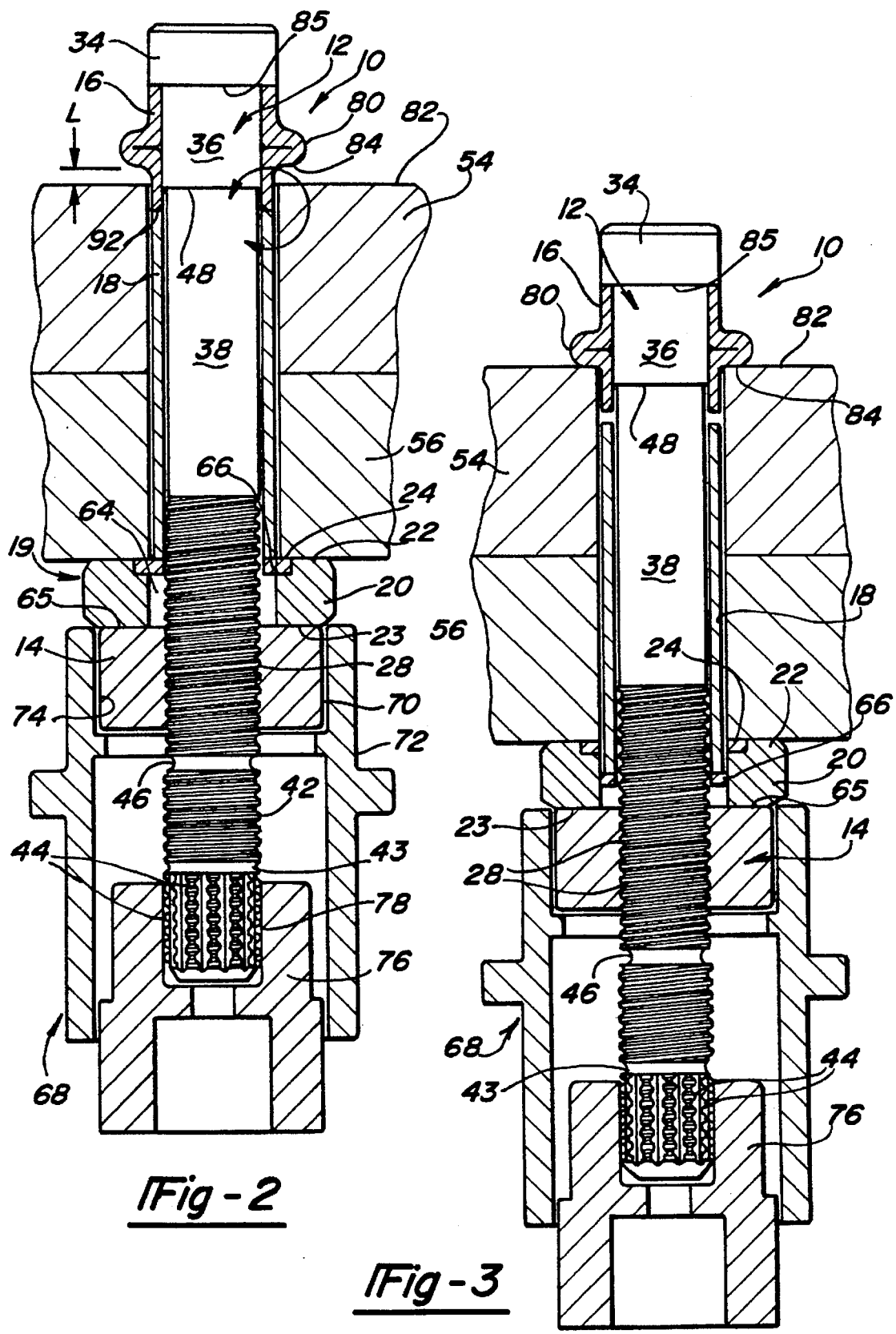

HIGH STRENGTH TORQUE TYPE BLIND BOLT WITH ANTI-ROTATION

CROSS REFERENCE TO RELATED PATENTS

The present invention is related to United States patents for High Strength Blind Bolt issued Jan. 12, 1993, under U.S. Pat. No. 5,178,502 and High Strength Blind Bolt With Uniform High Clamp Over An Extended Grip Range issued May 25, 1993 under U.S. Pat. No. 5,213,460 and is a continuation-in-part of U.S. patent application Ser. No. 08/317,293, Filed Oct. 3, 1994 for Improved High Strength Blind Bolt With Uniform High Clamp Over An Extended Grip Range and the disclosure of which is incorporated herein by reference.

SUMMARY BACKGROUND OF THE INVENTION

The present invention relates to multi-piece fasteners and more particularly to a high strength blind bolt of the threaded torque type for providing a high final clamp load of workpieces secured together. As noted in the above related patents and patent application such blind fasteners, while of general utility, can be particularly useful in constructions utilizing box beams or columns, bridges and the like and more particularly in applications where accessibility on one side of the workpiece is blocked or limited.

The fastener of the present invention also relates generally to multi-piece blind bolt fasteners which include a main sleeve, an expandable sleeve and a pin wherein the expandable sleeve is expanded radially to form a blind head in response to a relative axial force applied via the pin. In this regard the blind bolt of the present invention, in addition to the patents noted above, is generally related to threaded blind fasteners of the type shown in U.S. Pat. No. 3,643,544 issued Feb. 22, 1972 to Joseph H. Massa; fasteners of this type have been sold under the trade names Visu-Lok and/or Jo-Bolt by the Monogram Aerospace Fastener Company and Voi-Shan Manufacturing Company of the U.S. See also U.S. Pat. No. 3,262,353 issued Jul. 26, 1966 to R. Waeltz et al, U.S. Pat. No. 2,765,699 issued Oct. 9, 1956 to J. LaTorre, U.S. Pat. No. 2,887,003 issued May 19, 1959 to Brilmeyer and U.S. Pat. No. 3,107,572 issued Oct. 22, 1963 to Orloff. As noted in the related U.S. Pat. No. 5,213,460 the prior blind bolt fasteners have certain problems since the main sleeve can absorb a significant portion of the force available to develop the clamp load and in addition the clamp load, tensile strength and blind side protrusion can vary within the grip range of the fastener. In this regard the grip range of the fastener is defined by the difference between the maximum total thickness and the minimum total thickness of workpieces which can be secured together by a single fastener. In the present invention, however, a unique blind bolt construction is provided having a wide grip range capability and in which a high strength blind head of a uniform structure is formed over this wide grip range. Thus the blind head of uniform structure will have the same blind side protrusion over the grip range. In addition the present invention provides a structure in which high strength materials can be used resulting in a high strength fastener while at the same time achieving a high, uniform clamp force.

In the present invention, a threaded nut and core bolt or pin construction is used and, as such, a nut member is threadably engaged on a threaded portion of the shank of the pin. A splined portion is located at the terminal end of the pin shank. An installation tool has a central socket member adapted to engage the splined portion and an outer wrench member adapted to grip the nut whereby torque can be applied between the core bolt or pin and the nut to provide relative rotation by which the nut is threaded onto the pin to attain the desired clamp up. A pair of sleeves, an expandable sleeve and a main sleeve, located on the pin cooperate to form a blind head in response to the applied torque.

In the present invention, as a result of the applied torque between the nut and the pin, the nut initially transmits an axial force to the main sleeve via a grip adjuster. At the same time, the pin has an enlarged head which transmits an opposite axial force against the expandable sleeve. As the torque and resultant relative axial force increases, the expandable sleeve, reacting against the main sleeve, is radially expanded to form a blind head. As will be seen a blind head of uniform shape is provided over the extended grip range of the fastener.

In many cases, the conventional installation tools for TC type high tension bolts apply relative torque between the pin and nut whereby either can rotate relative to the other. In the event the pin is rotated relative to the nut the frictional engagement between the pin head and expandable sleeve could result in abrasion and unwanted wear and deformation of these components. This could adversely affect the formation and strength of the blind head. Such relative rotation is likely to occur where the pin and expandable sleeve are coated with an anti-corrosion coating. Such coatings frequently add lubricity to the engaging surfaces, reducing friction and thereby enhancing the likelihood of pin rotation. In the present invention, an anti-rotation structure is formed at the engaging surfaces between the pin head and the expandable sleeve whereby such relative rotation is inhibited.

At this stage of the installation the workpieces have not been subjected to any clamp loads between the nut and grip adjuster and the blind head via the pin. In order to bring the blind head into engagement with the blind side surface, the grip adjuster is provided with a frangible member which is in blocking communication with a cavity. The frangible member is adapted to fracture at a preselected magnitude of relative axial force whereby the cavity which is no longer blocked is now accessible permitting axial movement of the main sleeve away from or out of load bearing relationship with the expandable sleeve; this permits the fully formed blind head to be brought into contact with the blind side surface of the workpieces with no axial restraint from the main sleeve which has moved substantially freely out of load bearing engagement with the expandable sleeve. Now the workpieces are pulled together by the further application of torque with the resultant relative axial force acting substantially solely between the blind head through the pin and the nut. The force clamping the workpieces together continues to increase until a magnitude of torque is attained at which a splined, pintail portion on the core bolt or pin is fractured from the pin. This fracture load determines the final clamp load on the workpieces. In one form of the present invention the blind bolt employs a core bolt or pin having a splined end portion in which the spline crests are of generally the same diameter as the crests of the adjacent bolt threads; a continuous thread form extends across the splined portion and the threaded portion. By providing a pin with such a splined structure, a conventional double socket drive tool used for TC bolts can also be used for installing the noted blind torque type bolts for use in workpiece bores of the same diameter.

As will be seen, the grip adjuster can be of a relatively simple construction and can be made of a high strength material whereby the strength of the frangible resistance or shear portion can be set at a high level. In this regard, this relatively simple construction readily allows the load for shearing the frangible resistance portion to be set at a level high enough to guarantee formation of the blind head and low enough to fracture before attainment of the final torque load for final clamp and fracture of the breakneck.

In one form of the invention both the main and expandable sleeves can be of generally straight tubular constructions of generally uniform cross-sections, i.e. without any significant change of cross section along their lengths, and the blind head is formed, through column loading, after insertion into the workpiece openings, by bulbing a portion of the expandable sleeve which is located beyond the blind side of the workpieces. In this regard, this type of structure is generally of the kind shown in U.S. Pat. Nos. 2,061,628 and 2,026,629 issued Nov. 24, 1936 to Huck, U.S. Pat. No. 2,114,493 issued Apr. 19, 1938 to Huck and U.S. Pat. No. 2,527,307 issued Oct. 24, 1950 to Huck. Formation of the blind head at a preselected location can be facilitated by annealing a circular band on the expandable sleeve at the desired location. See in this regard U.S. Pat. No. 3,253,495 issued to Orloff on May 31, 1966. As will be seen the bulbed blind head can provide an enlarged bearing surface and hence be especially useful in applications in which the workpiece openings are substantially larger than the effective diameter of the fastener.

Another form of blind head frequently employed with blind fasteners is referred to as a tuliped blind head. An example of a blind head of a tulip shape is shown in the U.S. Pat. No. 3,136,204 issued Jun. 9, 1964 to P. J. Reynolds; see also U.S. Pat. No. 4,012,984 Issued Mar. 22, 1977 to Matuschek, U.S. Pat. No. 4,451,189 issued May 29, 1984 to Pratt and U.S. Pat. No. 4,627,775 issued Dec. 9, 1986 to Dixon. In one form of the invention where a blind tuliped head is formed, this is done by forming the blind head to have a final form including both bulbed and tuliped blind head constructions whereby the strength of the blind head is increased.

As noted with the fastener of the present invention, a unique construction is provided in which the final clamp load onto the workpieces is maximized and none is absorbed by the sleeve structure; at the same time the fastener can be provided with a determinable, wide grip range and the maximized final clamp load will be generally uniformly available over this wide grip range. As will be seen, one form of the present invention inhibits distortion of the expandable sleeve by providing a structure for controlling the magnitude of axial force applied to the expandable sleeve after the formation of the bulbed head but prior to fracturing the frangible resistance or shear member. Such distortion could result in a reduction in the final clamp load attained on the workpieces.

Features of the present invention can be utilized with fasteners having the blind head formed by radial expansion of an expandable sleeve by a tapered nose portion on a main sleeve member, see U.S. Pat. Nos. 5,178,502 and 5,213,460, supra.

Thus the high strength blind bolt of the present invention is readily adaptable for use in applications utilizing high strength bolts, such as those meeting ASTM A325 or Japanese J1SB1186/F8T specifications. It is also desirable for use where blind welding, nut plates and other complex construction fastening systems are used in such structural elements such as box beams where there is no access to the backside of the joint. In this regard, the blind fastener of the present invention is especially suited in the construction of buildings, bridges, and the like where high strength and durability are of considerable importance along with the capability of providing high clamp loads.

Thus it is an object of the present invention to provide a torque type threaded blind bolt construction facilitating the use of high strength materials resulting in a high strength fastener having a wide grip range.

It is another object of the present invention to provide a unique blind bolt construction for providing a blind head having a combined bulbed and tuliped formation.

It is another general object of the present invention to provide a unique torque type threaded blind bolt of a high strength construction and that forms a high strength blind head having a uniform, desired configuration over a wide grip range.

It is another general object of the present invention to provide a unique high strength blind bolt utilizing a torque type threaded construction and providing a generally uniform high final clamp load over a wide grip range.

It is still another object of the present invention to provide a unique torque type threaded fastener having a pin with an enlarged head engaging an expandable sleeve and including a construction for inhibiting relative rotation between the pin and the expandable sleeve.

Other objects, features and advantages of the present invention will become apparent from the subsequent description and the appended claims, taken in conjunction with the accompanying drawings, in which:

DESCRIPTION OF THE VIEWS OF THE DRAWINGS

FIG. 2 is a view similar to FIG. 1, to reduced scale, showing the blind fastener after the expandable sleeve has been radially expanded at a point away from the workpiece surface, by an installation tool partially shown, to form a bulbed blind head;

FIG. 3 is a view similar to FIG. 2 showing the blind fastener after the bulbed blind head has been formed and a frangible resistance portion of the grip adjuster structure has been fractured permitting the main sleeve to move axially into a cavity with the bulbed blind head in engagement with the rear workpiece surface;

DESCRIPTION OF EMBODIMENTS OF THE INVENTION

Figure 1:
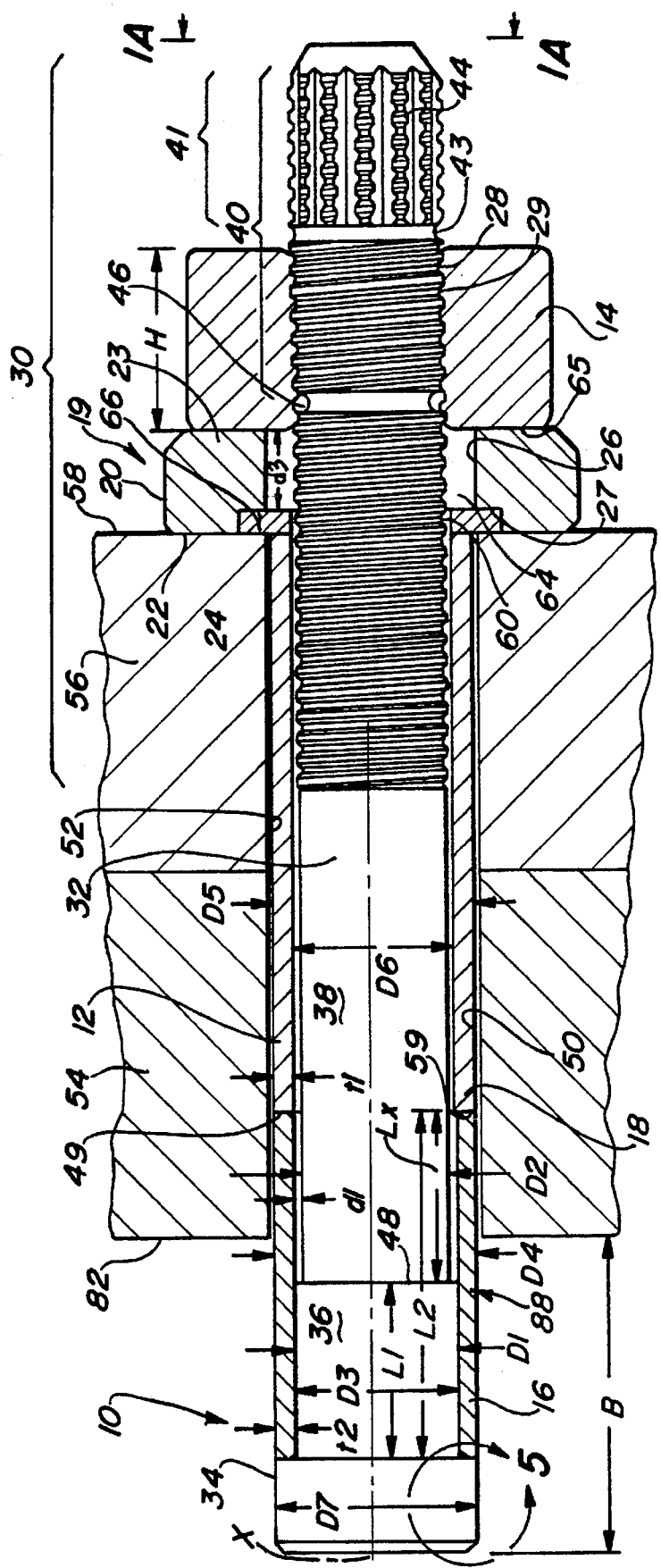
FIG. 1 is a longitudinal view, with some portions shown in section, of a blind fastener of the present invention including a core bolt or pin, a nut, an expandable sleeve, a main sleeve and a grip adjuster structure in assembly relationship with workpieces to be secured together.

Looking now to FIG. 1, a threaded or torque type blind fastener 10 includes a core bolt or pin 12, an annular nut 14, an expandable sleeve 16, a main sleeve 18 and a grip adjuster construction or assembly 19 defined by a load bearing or hold-off washer 20 and a frangible resistance or shear washer 24. The bearing washer 20 has opposite annular load bearing surfaces 22 and 23 and a central through bore 26 with an enlarged counterbore 27 at its inner end. The shear washer 24 is of a diameter to be snugly received within the counterbore 27 in bearing washer 20. In this regard the axial depth of the counterbore 27 is generally the same or slightly greater than the thickness of the shear washer 24. The shear washer 24 extends radially inwardly partially into the bore 26 to partially block the bore 26 for a purpose to be described. The nut 14 has a threaded bore 29 whereby the nut 14 can be threaded onto mating threads 28 on a threaded portion 30 at one end of an elongated shank 32 of pin 12. The pin 12 has an enlarged head 34 at the other end of pin shank 32. The pin shank 32 has a first smooth shank portion 36 of uniform diameter extending from head 34 to a relatively second smooth shank portion 38 of a smaller uniform diameter which leads to the threaded portion 30. The threaded portion 30 includes a pintail portion 40 having a splined section 41. The splined section 41 is formed with a plurality of axially extending splines 44 and in one form of the invention comprised a generally conventional twelve pointed splined construction. The pintail portion 40 is connected to the remainder of threaded portion 30 via an annular breakneck groove 46. The breakneck groove 46 is of a reduced cross-sectional area which is designed to fracture at a predetermined torque load at the conclusion of the installation cycle. A relief groove 43 is provided at the juncture of the splined section 41 and the non-splined portion of threaded pintail portion 40 to facilitate formation of the spline without impairing the threads which follow. The diameter of the relief groove 43, while no greater than the root diameter of the threads 28, is greater than that of the breakneck groove 46 to assure that the desired fracture at the completion of installation will occur at the breakneck groove 46. The first shank portion 36 is of a diameter D1 which is larger than diameter D2 of second shank portion 38 whereby an annular shoulder 48 is defined. The shoulder 48 is located a preselected distance L1 from the pin head 34. The expandable sleeve 16 is of a generally uniform tubular shape having generally uniform inside and outside diameters, with the inside diameter D3 being generally equal to the enlarged diameter D1 of the first shank portion 36 with a slight clearance to facilitate assembly. Thus the first shank portion 36 acts as a guide for properly aligning the expandable sleeve 16 relative to the pin head 34. The expandable sleeve 16 has a generally uniform outside diameter D4. The expandable sleeve 16 is of a length L2 and is longer than the preselected distance L1 of shoulder 48 from the pin head 34 whereby it extends partially over second shank portion 38 by a distance $L_x$. As will be seen the distance $L_x$ is selected to be that length necessary to form a blind head and complete the final installation, to be described, without the shoulder 48 engaging the confronting end 49 of the main sleeve 18.

The main sleeve 18 has a generally uniform, tubular shape with an outer surface of generally constant maximum outside diameter D5 generally equal to the outside diameter D4 of expandable sleeve 16. The main sleeve 18 has a through bore of a generally uniform diameter D6 which is generally equal to the major diameter of the crests of the threaded portion 30 with a slight clearance to facilitate assembly. The diameter D2 of second shank portion 38 is generally equal to the roll or pitch diameter of the threaded portion 30; as will be noted, however, since the threads 28 will be of a relatively shallow root construction the diameter D2 of second shank portion 38 will be only slightly less than the major diameter of the threads 28 and hence of the bore diameter D6. At the same time, then, the bore diameter D6 of main sleeve 18 will be less than the bore diameter D3 of expandable sleeve 16. Thus the wall thickness t1 of the main sleeve 18 will be greater than the wall thickness t2 of expandable sleeve 16 by the radial depth d1 of shoulder 48.

In use of the fastener 10, the main sleeve 18 and pin shank 32 are adapted to be located in and extend through aligned openings or bores 50 and 52 in a pair of workpieces 54 and 56, respectively, with the outer surface 58 of workpiece 56 engaged by the load bearing surface 22 of the bearing washer 20. In this regard, the load bearing surface 22 has a sufficiently large effective bearing area to provide a desired distribution on the outer workpiece surface 58 of the installation loads as well as operating loads on the workpieces 54 and 56 after installation. In addition the opposite load bearing surface 23 fully engages the load bearing surface 65 of the nut 14 and provides a hard, wear resistance surface to resist the torque loads applied by the nut 14 as it rotates relative to the bearing washer 20. The outside diameters D4 and D5 of the expandable sleeve 16 and main sleeve 18, respectively, are selected to fit through the aligned openings 50 and 52 with a clearance fit. In this regard the diameter D7 of pin head 34 and the outside sleeve diameters D4 and D5 are generally the same, such that the assembly can be accepted through the openings 50 and 52 in a clearance relationship.

Looking now to the grip adjuster assembly 19, the resistance or shear washer component 24 is of a generally flat construction and has a central bore 60 of a reduced diameter adapted to receive the threaded shank portion 30 of pin 12 with a slight clearance fit. The bore 26 of the bearing washer 20 is of a uniform diameter and at the outer side of shear washer component 24 defines an enlarged outer grip cavity 64. The grip cavity 64 is enclosed at its outer end by the confronting, load bearing surface 65 of the nut 14. The bore 26 is of a diameter which is generally equal to the outside diameter D5 of the main sleeve 18 with a slight clearance to avoid frictional resistance to relative axial movement therebetween. The frangible shear washer component 24 is provided with a preselected thickness defining a shear section 66 of a selected width adapted to fracture at a preselected shear load relative to the periphery of the bore 26 resulting from the relative axial force between the pin 12 and main sleeve 18. The relatively close tolerance fits between the bore 60 of the shear washer 24 and threaded portion 30 of pin 12 maintain these components in general co-axial alignment and at the same time maintain the main sleeve 18 in coaxial alignment with the annular shear section 66 of shear washer 24. The axial depth d3 of the grip cavity 64 is selected to define the effective grip range of the fastener 10 and as such permits the complete formation of the blind head and its substantially unrestricted engagement with the blind side of the workpiece 54 throughout that grip range.

Figure 1A:
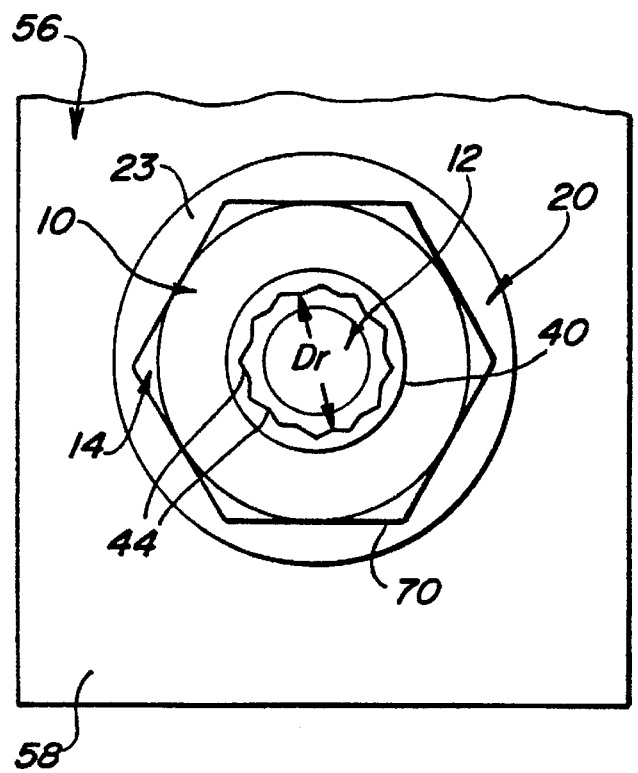
FIG. 1A is an end view, to reduced scale, of the fastener of FIG. 1 taken generally in the direction of the Arrows 1A in FIG. 1.

The fastener 10 is adapted to be set by torque applied between the pin 12 and nut 14 via the threaded engagement of nut 14 on the threaded shank portion 30. Looking now to FIGS. 2–4, the installation can be accomplished by a tool 68 of a construction generally known in the art and hence only a portion of the tool 68 is shown and the specific details thereof have been omitted for purposes of simplicity. The nut 14 has a conventional hexagonal outer surface 70 (see FIG. 1A) which is adapted to be drivingly engaged by a tubular socket like outer wrench member 72 having a hexagonally shaped radially inner surface 74 at its outer end configured to matingly receive the outer nut surface 70. (See FIG. 2) The tool 68 has a central socket member 76 which has a radially inner surface 78 at its outer end which is grooved to matingly receive the splines 44 defining the twelve pointed splined section 41 of the pin 12. In one form of the tool 68, the central socket member 76 is resiliently biased axially forwardly to provide sufficient engagement with the splined section 41. The outer wrench member 72 and central socket member 76 are adapted to be rotated relative to each other. Thus to install the fastener 10 the tool 68 is applied to the outer end of the fastener 10 with the outer wrench member 72 in engagement with the hexagonal nut surface 70 and with the central socket member 76 in engagement with the splined section 41. When the tool 68 is actuated, the outer wrench member 72 is rotated relative to the central socket member 76 whereby the nut 14 is threaded further onto the threaded shank portion 30. Frequently, at the beginning of the installation cycle, the central socket member 76 will be rotated while the outer wrench member 72 will be held from rotation thus rotating the pin 12 and sleeves 16 and 18, as a unit, relative to the stationary nut 14 and bearing washer 20; as the components of the fastener 10 and the workpieces 54 and 56 are brought into increased loading relationship the nut 14 will be rotated while the pin 12, sleeves 16 and 18 and bearing washer 20 will be held stationary. In either event, as this occurs the core bolt or pin 12 moves axially relative to the nut 14. At the same time, the resilient, axial bias on the central socket member 76 permits it to be moved axially rearwardly to thus accommodate the additional axial movement of the pin 12 relative to the tool 68. In this way a relative axial force is developed between the pin 12 and the main sleeve 18 and expandable sleeve 16 by virtue of the torque applied by the tool 68 between the pin 12 and nut 14.

At the same time, as the pin 12 begins to move axially via the relative rotation with the nut 14, the applied relative axial force thus increases the column loading on the expandable sleeve 16 causing it to be bulbed or expanded radially outwardly to fully define a first blind head 80 of a bulbed configuration at a point spaced from the blind side surface 82 of inner workpiece 54. (See FIG. 2). As the relative axial force increases the frangible shear washer 24 fractures across the shear section 66 permitting the main sleeve 18 and expandable sleeve 16 with the fully formed blind bulbed head 80 to move generally freely axially relative to each other and relative to the load bearing surface 22 of bearing washer 20. In this condition, the blind bulbed head 80 will be moved into engagement with blind side surface 82 of the inner workpiece 54. (See FIG. 3).

The shear section 66 of the frangible washer 24 is selected to be of sufficient shear strength to accept the magnitude of relative axial force required to bulb the expandable sleeve 16 to form the bulbed head 80 and to thereafter sever permitting the forward end of the main sleeve 18 to move within the grip cavity 64 of the bearing washer 20. In one form of the invention the shear section 66 was provided to have a shear strength to shear at a magnitude of relative axial force between around 15% to around 25% higher than the axial force at which the bulbed head 80 is fully formed as shown in FIG. 2.

The axial depth d3 of grip cavity 64 is selected to be greater than the distance L from the free end surface 84 of the blind head 80 of expandable sleeve 16 to the blind side surface 82 of workpiece 54 after the blind bulb head 80 is fully formed as shown in FIG. 2. The distance L can vary depending upon the total thickness of the workpieces being secured together. In a minimum grip condition, i.e. workpieces 54 and 56 of minimum total thickness, the distance L will be at its maximum and hence the grip cavity depth d3 should be at least slightly greater than this maximum distance L to assure that the main sleeve 18 is removed from load bearing engagement with the expandable sleeve 16 before the free end surface 84 of bulbed head 80 engages the blind side surface 82 under all grip conditions within the grip range of the fastener 10. This assures that the end surface 84 of bulbed head 80 will be freely moved into engagement with the blind side surface 82 of workpiece 54 as shown in FIG. 3. As noted, with the main sleeve 18 out of load bearing engagement, the full magnitude of the relative axial load resulting from the torque between the nut 14 and core bolt or pin 12 is applied to the workpieces 54, 56 substantially solely between the nut 14 and the pin 12 via the pin head 34 and the bulbed head 80.

Figure 6:
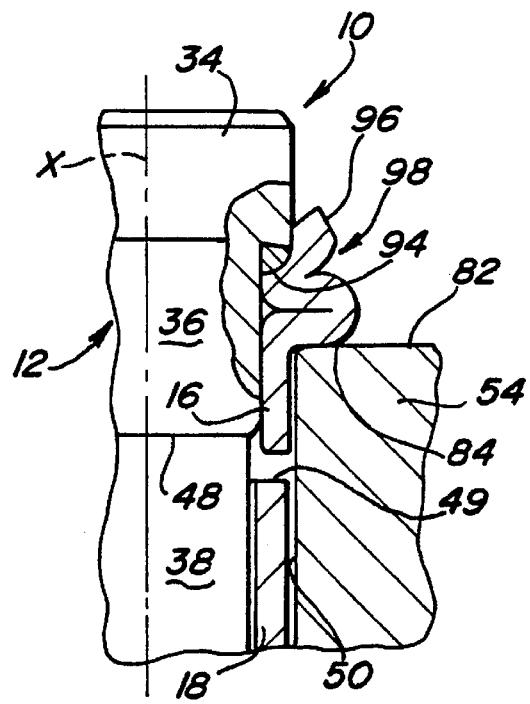
FIG. 6 is a fragmentary, partial sectional view to enlarged scale of a portion of the fastener of FIG. 4 illustrating the combination tuliped and bulbed blind head and taken generally in the area of the circle 6 in FIG. 4.

In order to optimize the strength of the blind head structure a double blind head construction is formed including a tuliped shaped blind head in combination with the bulbed blind head 80. Thus with the blind bulbed head 80 in engagement with the blind side surface 82 and with the main sleeve 18 out of load bearing engagement with the stop shoulder 48 the full torque load is again applied to the expandable sleeve 16 by the pin head 34. As this occurs and the relative axial load increases, the surface 85 under the pin head 34 will begin to cut a ring 94 of material from the end 92 of the expandable sleeve 16 as the pin head 34 moves into the open end of the expandable sleeve 16 and expands that end of the sleeve 16 radially outwardly to form an enlarged tuliped head 96. See FIGS. 4 and 6. With this construction, the tuliped head 96 reinforces the bulbed head 80 whereby a combination blind head 98 of increased strength is formed.

Figure 4:
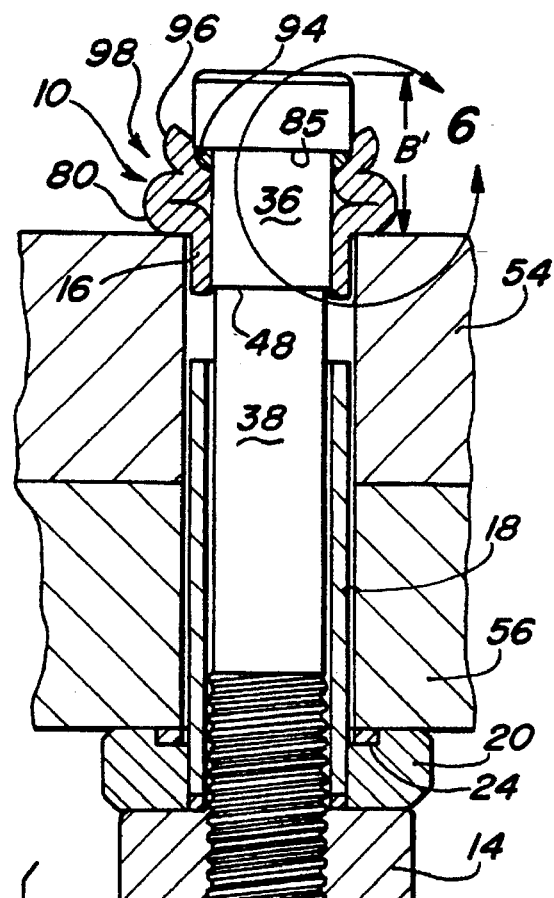
FIG. 4 is a view similar to FIGS. 2 and 3 showing the blind fastener after the formation of a tuliped blind head in cooperation with the bulbed blind head and after the fastener has been finally set.

In this condition the applied torque and resultant axial load is increased up to a preselected desired magnitude after which the breakneck groove 46 fractures whereby the pintail portion 40 is severed and the installation is completed as shown in FIG. 4. Thus the final desired clamp load as applied and attained by the set fastener 10 of FIG. 4 will not be affected by the main sleeve 18.

To promote the formation of the tuliped blind head 96, the underside surface 85 on the pin head 34 is tapered radially outwardly and axially forwardly. In one form of the invention the angle A of taper relative to a plane normal to the central axis X of the pin 12 was selected to be around 12.5 degrees (see FIG. 5). This configuration both enhances the tensile strength of the pin head 34 and assists in shearing the ring 94 and formation of the tuliped head 96. (See FIG. 6). At the same time, the engaging end 92 of the expandable sleeve 16d was formed to be radially in a plane generally at a right angle to the pin axis X. It can be seen from FIG. 6 that the combination blind head 98 has an increased effective shear area relative to the bearing area of the inner surface 82 surrounding the bore 50 and the pin head 34. In this regard it should be noted that the tuliped head 96, including the ring 94, is essentially in load bearing relationship with the bulbed head 80 whereby they react as a unitary structure to loads applied to the workpieces 54, 56.

One of the objectives is to provide a high strength blind fastener with minimal blind side clearance B (see FIG. 1). In applications where the installed fastener is constructed to have only the single blind head, such as bulbed head 80, the overall length L2 of the expandable sleeve 16 could be somewhat less with initially less pre-installed blind side clearance B than the expandable sleeve 16 as provided to form the combination bulbed and tuliped blind head 98. However, the increase in length is relatively slight and will be of negligible consequence, if any, when installed since the pin head 34 will move partially into the end of the expandable sleeve 16 in forming the blind tuliped head 96. In any event, the additional length to expandable sleeve 16 will be maintained a minimum in order to reduce stresses from column loading and to thus inhibit bulbing from column loading and assuring formation of the tuliped blind head.

As noted, a principal objective of the present invention is to provide a blind fastener having very high strength characteristics in which conventional high strength bolts and/or welded joints have been used. In addition to providing a blind head 80 which has a high strength, the materials of the fastener 10 are selected to be of high strength and hence high hardness. Thus the core bolt or pin 12 can be made of a high strength steel having a preselected desired hardness. In one form of the invention the pin 12 was made of an AISI 4140 alloy steel and having a Rockwell hardness of between around 35Rc to around 40Rc. The nut 14 can be made of the same material and in one form was made with a Rockwell hardness of between around 25Rc to around 35Rc.

At the same time the shear washer 24 was constructed of a similar material having a hardness to provide a brittle fracture across the shear section 66. In one form of the invention the shear washer 24 was constructed of an AISI 4140 alloy steel having a Rockwell hardness of between around 40Rc to around 46Rc.

The bearing washer 20 can also be constructed of a ferrous or other material such as a high carbon steel. In one form of the invention the bearing washer 20 was constructed of an AISI 4130 alloy steel having a Rockwell hardness of between around 35Rc to around 44Rc. With this construction, the formation of the grip adjuster structure or assembly 19 can be simplified and at the same time the materials of the bearing washer component 20 and frangible, shear washer 24 can be separately selected to optimize the performance of each.

In this regard the main sleeve 18 can be constructed of a medium carbon hardened steel while the expandable sleeve 16 can be constructed of a low carbon steel that may be work hardened during formation by cold heading or cold drawing. In order to facilitate the formation of bulbed head 80 at a desired location, the expandable sleeve 16 is locally annealed in a band over a section generally indicated by the numeral 88 (see FIG. 1). The annealed section 88 is preferably located midway along the length of the expandable sleeve 16 in order to provide the formation of the bulbed blind head 80 in a column failure or collapsed mode at this mid location and at the same time to facilitate non-directional assembly onto the pin 12. In one form of the invention the main sleeve 18 was constructed of a medium carbon steel having a Rockwell hardness of between around 43Rc to around 47Rc. The expandable sleeve 16 was constructed of an AISI 1018 steel having a Rockwell hardness of between around 85Rb to around 95Rb with the annealed section 88 being annealed over a gradient to a minimum Rockwell hardness of around 60Rb. Thus, with pin head 34 being of substantially higher strength than the expandable sleeve 16, the angle A (see FIG. 5) of tapered surface 85 can be selected relative to the form of the expandable sleeve 16 at the engaging end to facilitate cutting of the ring 94 and formation of the tuliped head 96.

In one embodiment of the invention for a nominal 24 mm (0.94 inches) diameter size fastener 10 of the above noted materials and construction, the expandable sleeve 16 was made with an outside, nominal diameter D4 of 24.5 mm (0.96 inches) and an inside diameter D3 of 18.8 mm (0.742 inches). The overall length L2 of sleeve 16 was 43 mm (1.70 inches) with the band annealed or softened section 88 provided midway along the length L2. With such a construction the desirable combination blind head 98 was formed including the bulbed head 80 and tuliped head 96. In this regard it is believed that the location of the band annealed or softened section 88 should not vary by more than approximately 6.4 mm (0.25 inches) from the midpoint (0.5×L2) of the length L2 of the expandable sleeve 16. Even with the softened section 88 located at the midpoint (0.5× L2) of the sleeve 16, the overall length L2 of the sleeve 16, for the construction noted above, should preferably not be less than around 36 mm (1.425 inches). At the same time the length L2 should not appreciably exceed the length noted for the sleeve 16 constructed as indicated above. The specific dimensions for expandable sleeves 16 for fasteners 10 with different nominal diameters and/or different materials can be determined accordingly.

It should be noted that in some applications the sleeves 16 and 18 could be combined in a one piece construction, see U.S. Pat. Nos. 5,213,460 supra.

In one form of the invention the splines 44 can be formed by cutting the spline grooves on the end portion of the pin blank which is of the same diameter as the adjoining portion of the blank. The relief groove 43 and the breakneck groove 46 can be rolled before or after the splines 44 are cut. Next the thread can be formed by rolling over the splined section 41 and on to the adjoining portion of the blank. The result will be a continuous thread form over the splined section 41 and the adjoining threaded section of the threaded portion 30 including the relief groove 43 and breakneck groove 46. Alternatively, the breakneck groove 46 could be cut into the threaded portion 30 at the desired location and to the desired depth after the thread roll step. In still another form, the splines 44 could be cut after the thread form has been rolled onto the threaded portion 30.

With the unique constructions as defined above the nut 14 can be threaded onto non-splined section of the threaded portion 30 by first being threaded over the threaded, splined section 41. In this way the radial depth of the splines 44 can be set to provide the desired strength while maintaining the minor diameter Dr of the root of the splines at a maximum (See FIGS. 1 and 1A). At the same time the crests or points of the splines 44 can be at a major diameter equal to or slightly less than the major or crest diameter of the threads 28. With this construction the strength of the breakneck groove 46 can be maximized by forming it to a diameter generally slightly less than the minor or root diameter Dr of the splines 44. At the same time, this maximized spline diameter feature allows use of a conventional tool having the same internal, central wrench socket member 76 and the same external hex socket member 72 as are used on existing, conventional tension control, non-blind splined bolts for the same hole diameter.

In this regard, it should be noted that the conventional, non-blind TC bolt fasteners generally include only a bolt and a nut and possibly a bearing washer. Thus for securing different workpieces having generally the same hole diameter, the bolt member of the TC bolt (non-blind) fastener will have a diameter generally equal to the outside diameter D4, D5 of the sleeves 16 and 18 of the subject blind fastener 10. Thus the bolt of the conventional non-blind fastener will be of a larger diameter than the pin 12 of the present blind fastener. The unique splined pintail section 41, however, being of a maximum diameter relative to the diameter of pin 12 will be constructed to be of the same diameter as the conventional reduced diameter splined portion on the TC bolt. At the same time, the nut 14 will have a smaller threaded bore 29 than the threaded bore of the nut for the tension controlled bolt. However, the hexagonal outer surface 70 of nut 14 for the blind fastener 10 is constructed to be of the same size and shape as that of the nut for the conventional non-blind TC bolt. Thus, since the splined portions on the bolt of the conventional non-blind fastener and the pin 12 of the present blind fastener 10 are of the same diameter and same spline configuration and the nut members have the same sized and shaped hexagonal outer surfaces, the same installation tool 68 can be used to install either type fastener for application in workpiece holes generally of the same diameter. One such conventional tool which can be used interchangeably on a conventional non-blind fastener and the present unique blind fastener 10 is manufactured by Maeda Metal Industries of Japan and sold under the trademark TONE with one model size being S-90EZ.

It should be noted that the expandable sleeve 16, can be provided to be of a minimum length L2 sufficient to assure that the blind bulbed head 80 is formed generally uniformly to the desired final diameter while also permitting formation of the blind tuliped head 96. Thus an expandable sleeve 16 of minimum length can accommodate the entire grip range which as noted can be selected to be large. At the same time the blind bulbed head 80 will be of a relatively large, constant diameter regardless of the grip thereby providing for a large bearing area against the blind side surface 82. The large diameter blind bulbed head 80 also permits use of the fastener 10 in applications where there is a relatively large clearance between the workpiece openings 50 and 52 and the expandable sleeve 16.

Note that with the construction as shown in FIGS. 1–4 a single expandable sleeve 16 could be used with a number of different lengths of fasteners such as fastener 10, i.e. longer or shorter pins 12 and main sleeves 18. In addition the feature of forming the blind bulbed head 80 in air and spaced from the rear workpiece surface 82 (see FIG. 2) results in a uniform back-side protrusion throughout the grip range (see FIGS. 3 and 4).

The number of threads of nut 14 engaged with the threaded pin shank portion 30 in full, final engagement is selected to be sufficient to provide the desired high level of clamp up of the workpieces 54 and 56 and to resist the maximum design tensile load on the resultant joint. Thus the nut height or width H of nut 14 is selected to be sufficient to provide the necessary number of threads to withstand these loads on full thread engagement (see FIG. 1). At the same time the length of the threaded pin shank portion 30 is selected to provide full thread engagement with the threads of nut 14 over the entire grip range of the fastener 10 while providing the minimum protruding length B" after installation. (See FIG. 4). In this way the overall length of the fastener 10 can be minimized in both the installed and uninstalled conditions.

Note that the main sleeve 18 can have a wall thickness which can be maximized for the diameter of the threaded portion 30 of the pin 12 and the diameter of the workpiece bores 50, 52. Thus the column strength of the main sleeve 18 can be maximized for a given sized fastener 10 and workpiece bores 50, 52. In this regard the extra wall thickness of the main sleeve 18 relative to that of the expandable sleeve 16 as permitted by the stepped construction of pin shank portions 36 and 38 will provide a further increase in its column strength. At the same time the shear load of the frangible washer component 24 can be readily adjusted simply by selection of the thickness of the shear section 66 and by selection of the strength and hence shear strength of the material of the frangible washer 24. In this way the expandable sleeve 16 can be selected to be of a higher strength construction and material requiring a higher load for creating the blind bulbed head 80. The result will be a fastener having a generally greater overall strength.

In addition it can be seen that the expandable sleeve 16 and main sleeve 18 after installation of the fastener 10 will define generally continuous axially extending surfaces for engagement with the confronting surfaces of workpiece bores 50 and 52. In this way the integrity of the joint can be improved since there will be essentially minimal gaps between the surfaces of the workpiece bores 50 and 52 and the expandable sleeve 16 and main sleeve 18.

In order to minimize the installation torque loads and thus assist in the proper functioning of the fastener components and the consistent, proper installation of the fastener, a high quality, baked on dry film lubricant such as molydisulphide has been found desirable on the pin 12 and on all surfaces of the bearing washer component 20 to reduce friction between the moving parts of fastener 10. A molydisulphide lubricant such as Kalgard FA manufactured by Kalgard Corporation has been found to be satisfactory.

An electro-zinc corrosion resistant plating and wax type lubricant such as paraffin may also be desired on the nut 14. The expandable sleeve 16, the main sleeve 18 and the shear washer 24 are not lubricated and/or coated; however, the expandable sleeve 16 in some cases may be plated similarly to the nut 14. Thus, in the steps of forming the bulb on expandable sleeve 16 and in shearing the shear washer 24 there is substantially no relative rotation between the core bolt or pin 12 and the expandable sleeve 16 or between the expandable sleeve 16 and the main sleeve 18. Excessive relative rotation between these pin and sleeve components could generate frictional heating of the sleeve ends 49, 92 sufficient to produce swelling of the sleeve ends 49, 92 that might inhibit proper installation of the fastener. Thus with the above construction such relative rotation is inhibited and the pin and sleeve components can rotate as a unit with the pin 12 while the bearing washer component 20 and the nut 14 are stationary. When the shear washer 24 shears and the bulbed head 80 on sleeve 16 moves to the rear surface 82 of workpiece 54 the developing clamp load causes pin 12, expandable sleeve 16 and main sleeve 18 to stop rotation and further clamp load is developed between the workpieces 54, 56 by rotation of the nut 14 alone relative to the pin 12 and against the stationary bearing washer 20. As noted, here the engaging surfaces and engaged threads are lubricated whereby friction is minimized.

In some applications, in addition to the coating and/or plating applied to the pin 12, nut 14 and bearing washer 20, it may be desirable to apply an anti-corrosion oil to the expandable sleeve 16, main sleeve 18 and shear washer 24. One type of anti-corrosion oil can be an oil sold under the trade name LANACOTE by Amrep Inc. In this case, however, because of the lubricity added by the anti-corrosion oil and in order to inhibit the unwanted relative rotation discussed above, the engaging surfaces may be roughened such as by knurling or serrating. Thus in such cases the opposite end surfaces 49 of main sleeve 18 and opposite end surfaces 92 of expandable sleeve 16 may be roughened. In addition the underside surface 85 of pin 12 can be similarly roughened. This can be done during heading of these components. In this way the unwanted, relative rotation between components can be precluded.

Figure 8:
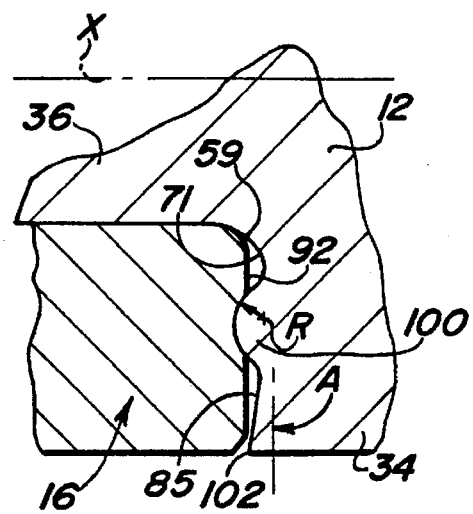
FIG. 8 is a sectional view to enlarged scale similar to FIG. 5 depicting the anti-rotation projections embedded into the confronting end of the expandable sleeve.
Figure 7:
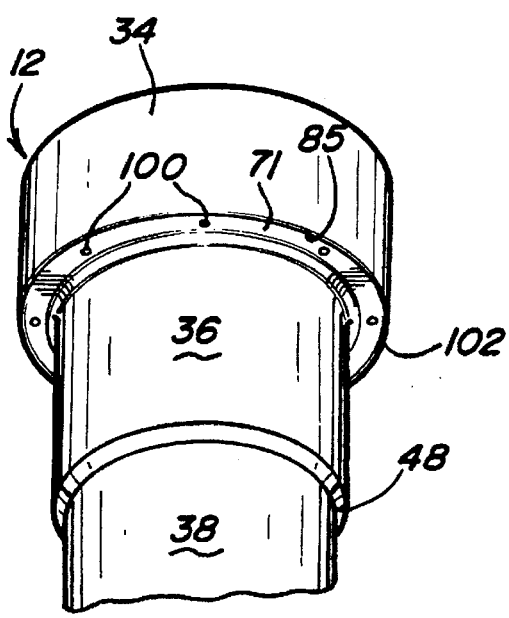
FIG. 7 is a fragmentary pictorial view to enlarged scale of the underside of the pin head depicting anti-rotation projections.

However, it is believed that a simpler, more desirable way to prevent relative rotation between the pin 12 and the expandable sleeve 16 is to provide a plurality of circumferentially spaced projections on the underside surface 85 of the pin head 34. Looking now to FIGS. 5, 7 and 8 a plurality of axially extending projections 100 are shown to be formed on the underside surface 85 of the pin head 34. The projections 100 are generally arcuately formed and in one form for pin 12 having a diameter D3 of around 0.870 inches (2.2 cm) the projections 100 were formed as a segment of a hemisphere having a radius of around 0.030 inches (0.076 centimeters). The projections 100 are located radially inwardly from the outer end 102 of the pin head 34 and adjacent the radius 71. With a pin head 34 having an outside diameter of around 1.122 inches (2.85 cm) the center of each of the projections 100 was located around 0.084 inches (0.213 cm) radially inwardly from the radially outer end 102 of the pin head 34. This assures engagement of the projections 100 at a point on the end surface 92 of the expandable sleeve 16 generally midway between its radially inner and outer ends. This structure avoids the creation of stress risers at these radial ends of both the pin head 34 and the end surface 92 of the expandable sleeve 16. This construction also avoids interfering with the formation of the combination blind head 98. The projections 100 are smoothly, arcuately blended with the fillet radius 71 and with the underside surface 85. At the same time projections 100 extend axially beyond the outer end 102 of the pin head 34 sufficiently to provide uninhibited engagement with and adequate penetration of the confronting surface 92 of the expandable sleeve 16. In the construction shown the axially outer tip of projection 100 was constructed to extend axially around 0.015 inches (0.04 cm) beyond the outer end 102 of the pin head 34 and around 0.01 inches (0.025 cm) beyond the radius surface 71. As noted, the expandable sleeve 16 is made of a considerably softer material than the pin 12 whereby the projections 100 can become readily embedded into the surface 92 at a relatively low, axial load and hence torque between the pin 12 and the expandable sleeve 16. At the same time the projections 100 are relatively small and of a shape which also facilitates embedding at relatively low magnitudes of axial loads and hence torque.

It is important that the axis of main sleeve 18 be maintained in substantial coaxial alignment with the axis X of the pin 12 during the installation cycle. By providing the major diameter of the threaded portion 30 to be close to the diameter of the bore 60 through shear washer 24 such alignment will be essentially assured. Similarly the generally close fit between the central bore 60 of shear washer 24 and threaded shank portion 30 along with the generally snug fit of shear washer 24 in counterbore 27 in bearing washer 20 assists in providing the desired alignment between main sleeve 18, shear section 66 and bearing washer bore 26.

Figure 5:
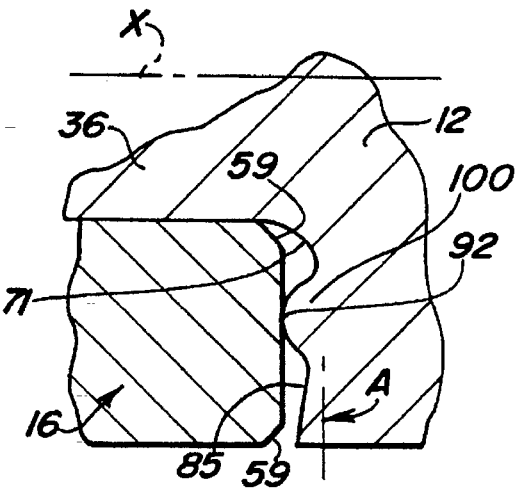
FIG. 5 is a fragmentary, sectional view to enlarged scale depicting a portion of the head of the pin taken generally in the area of the circle 5 in FIG. 1 and having a construction for assisting in the formation of the tuliped portion of the blind head and depicting one of a plurality of projections for inhibiting relative rotation between the pin and the expandable sleeve.

With the use of high strength, high hardness materials, it is desirable to reduce the stress concentrations such as that at the juncture between the inner surface 85 of the pin head 34 and smooth shank portion 36 (see FIG. 5). This is accomplished by providing a generally streamlined shape to the arcuate fillet 71 located at that juncture. It should also be noted that the opposite end surfaces 92 of the expandable sleeve 16 are generally planar and extend substantially at right angles to the pin axis X. At the same time chamfers 59 are provided on the inside diameter at the opposite ends 92 of expandable sleeve 16. The chamfers 59 plus the radially inner clearance between under surface 85 of pin head 34 and sleeve end surface 92 assures that the confronting end 92 of expandable sleeve 16 will not engage the fillet 71. In this regard, the chamfers 59, which also assist assembly, are similarly located on both ends of the expandable sleeve 16 to provide a symmetrical structure to preclude the need for any special orientation of sleeve 16 as it is assembled onto pin 12. At the same time opposite end surfaces 49 of main sleeve 18 are generally planar and extend substantially at right angles to the pin axis X. In addition the planar end surfaces 92 and 49 of sleeves 16 and 18, respectively, will provide good bearing surfaces against each other. In this regard planar surface 49 of main sleeve 18 also provides a good bearing surface against the shear washer 24. In addition to the reduction of the stress concentrations, as noted, it is desirable to reduce stress concentrations between mating threads. Thus the threads 28 of the threaded shank portion 30 are formed to be generally shallow in depth and to have roots of a generally streamlined contour. Thus, in one embodiment, the threads 28 could utilize the groove shape and concepts of '852 Dixon patent previously noted. With this root construction, the stress concentration at the threads 28 is also reduced.

As noted in the '852 Dixon patent, the threads 28 can be of a shallow helical construction with a generally streamlined shape whereby a high strength joint construction can be achieved having a desirable high clamp load. With the noted shallow thread structure, a close tolerance fit with the threads of the nut 14 is desirable. In one form of the invention a Class 3 thread fit was utilized. Thus with a major diameter of 0.612 inches on the threads 28 of the pin shank portion 30, a major diameter of 0.618 inches was used on the mating threads of the nut 14.

As noted it is desirable that the high strength fastener of the present invention provide a high final clamp load to the fastened joint. To achieve this result high installation loads including final pin break load at breakneck groove 46 are required from the installation tool 68. These loads, however, are applied by torque and hence are generally absorbed by the tool 68 and are essentially not transmitted to the operator handling the installation tool 68. Thus the high load occurring at pin break at breakneck groove 46 is substantially absorbed by the tool 68 by virtue of the torque application to the fastener 10. The magnitude of installation torque required by the installation tool 68 can be substantially reduced by use of the selective lubrication previously discussed such that the rotational speed of the final output of the tool 68 can be increased whereby the time required for installation can be significantly reduced.

One of the advantages of the use of a minimum length L2 of the expandable sleeve 16 is a significant reduction in blind side clearance B (see FIG. 1). Also the final installed blind side clearance B' can be minimized (see FIG. 4). At the same time the final blind side clearance B' will be uniform over the extended grip range of the fastener 10 since, as noted, the blind bulbed head 80 is formed uniformly away from the back surface 82 of workpiece 54 (see FIG. 2).

It should be noted that various features of the different embodiments of the noted parent application can be interchanged and can be used with the anti-rotation projection structure as shown and described above. In addition with each of the embodiments shown, it can be seen that for fasteners of the same diameter for use in different grip ranges literally only the pin and main sleeve need be changed to accommodate the required changes in length of the fasteners. This feature simplifies the manufacture and inventory requirements of the fastener components.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A blind bolt for securing a plurality of workpieces at a final desired final clamp load with the workpieces having aligned openings therein and having an accessible side surface and a blind side surface and adapted to be installed by a relative axial force resulting from torque applied by an installation tool from the accessible side surface of the workpieces with the final clamp load being attained by a relative axial force of a first magnitude, said blind bolt comprising:

a pin member having an elongated pin shank terminating at one end in an enlarged pin head;

said pin shank having a helical thread form extending over a threaded portion at its end opposite said pin head, said pin shank having a torque drive end portion adapted to be engaged by the installation tool, a nut member having an internal mating thread form adapted to be threaded onto said threaded portion of said pin shank and including an engaging portion adapted to be engaged by the installation tool, engaging means including said nut member for engaging the accessible side surface of the workpieces in load bearing relationship, said engaging portion on said nut and said drive end portion on said pin shank adapted to be simultaneously engaged by the installation tool whereby torque can be applied between said pin member and said nut member resulting in a relative axial force between said pin member, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, said second sleeve portion being radially deformable at a location between said pin head and the blind side surface of the workpieces in response to the relative axial force of a second magnitude less than said first magnitude to form an enlarged blind head for reacting against the blind side surface, said sleeve means including collapsible means adapted to collapse at a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said pin head having a first engaging surface on its underside, said second sleeve portion having a second engaging surface in confrontation with said first engaging surface of said pin head, axially extending projection means operatively connected with said first and second engaging surfaces for inhibiting relative rotation between said pin member and said second sleeve portion in response to torque applied by the installation tool, said projection means comprising a plurality of axially entending projections circumferentially disposed about said first engaging surface on said pin head, said pin head being of a substantially higher hardness than that of said second engaging surface on said second sleeve portion whereby said projections can be readily embedded into said second engaging surface to inhibit such relative rotation, said projections located radially inwardly from the radially outer end of said first engaging surface and adapted to engage said second engaging surface at a location radially spaced from the radially inner and outer ends of said second engaging surface, said projections being generally arcuately shaped whereby stress risers at said pin head in the area of said projections and at the portions of said second engaging surface engaged by said projections are avoided.

2. The blind bolt of claim 1 with said expandable sleeve structure having a weakened portion adapted to fold radially outwardly to form said blind head in a bulb form in response to the relative axial force of said second magnitude.

3. The blind bolt of claim 1 with said collapsible means including a load bearing member adapted to be in load bearing relationship with the accessible side surface of the workpieces and a frangible structure operatively connected with said load bearing member, said load bearing member having a generally axially extending receiving bore adapted to receive said first sleeve shank portion, said frangible structure being supported by said load bearing member in a position partially blocking said receiving bore, said frangible structure being engageable by the outer end of said first sleeve shank portion and having a preselected shear area adapted to shear upon application of said third magnitude of relative axial force whereby said first sleeve shank portion can move axially into said receiving bore, the portion of said receiving bore extending from said frangible structure to the outer end of said load bearing member defining a grip cavity of preselected length generally equal to the grip range of the fastener, where the grip range is defined as the difference between the minimum and maximum total thickness of the workpieces that a single fastener can secure together.

4. The blind bolt of claim 1 with said second sleeve shank portion being an expandable sleeve structure separate from said first sleeve shank portion and having a weakened portion adapted to fold radially outwardly to form said blind head with a bulb formed portion in response to the relative axial force of said second magnitude, said expandable sleeve structure having a first through bore adapted to receive said pin shank, said pin head adapted to move into said first through bore to radially outwardly expand that end of said expandable sleeve structure whereby said blind head includes a tulip shaped portion adjacent to said bulb formed portion.

5. A blind bolt for securing a plurality of workpieces at a final desired final clamp load with the workpieces having aligned openings therein and having an accessible side surface and a blind side surface and adapted to be installed by a relative axial force resulting from torque applied by an installation tool from the accessible side surface of the workpieces with the final clamp load being attained by a relative axial force of a first magnitude, said blind bolt comprising:

a pin member having an elongated pin shank terminating at one end in an enlarged pin head;

said pin shank having a helical thread form entending over a threaded portion at its end opposite said pin head, said pin shank having a torque drive end portion adapted to be engaged by the installation tool, a nut member having an internal mating thread form adapted to be threaded onto said threaded portion of said pin shank and including an engaging portion adapted to be engaged by the installation tool, engaging means including said nut member for engaging the accessible side surface of the workpieces in load bearing relationship, said engaging portion on said nut and said drive end portion on said pin shank adapted to be simultaneously engaged by the installation tool whereby torque can be applied between said pin member and said nut member resulting in a relative axial force between said pin member, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, said second sleeve portion being radially deformable at a location between said pin head and the blind side surface of the workpieces in response to the relative axial force of a second magnitude less than said first magnitude to form an enlarged blind head for reacting against the blind side surface, said sleeve means including collapsible means adapted to collapse at a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said pin head having a first engaging surface on its underside, said second sleeve portion having a second engaging surface in confrontation with said first engaging surface of said pin head, axially entending projection means operatively connected with said first and second engaging surfaces for inhibiting relative rotation between said pin member and said second sleeve portion in response to torque applied by the installation tool, said collapsible means including a load bearing member adapted to be in load bearing relationship with the accessible side surface of the workpieces and a frangible structure operatively connected with said load bearing member, said load bearing member having a generally axially entending receiving bore adapted to receive said first sleeve shank portion, said frangible structure being supported by said load bearing member in a position partially blocking said receiving bore, said frangible structure being engageable by the outer end of said first sleeve shank portion and having a preselected shear area adapted to shear upon application of said third magnitude of relative axial force whereby said first sleeve shank portion can move axially into said receiving bore, the portion of said receiving bore extending from said frangible structure to the outer end of said load bearing member defining a grip cavity of preselected length generally equal to the grip range of the fastener, where the grip range is defined as the difference between the minimum and maximum total thickness of the workpieces that a single fastener can secure together, said load bearing member comprising an enlarged bearing washer located between said nut member and said outer end of said first sleeve shank portion and adapted to engage the accessible side surface of the workpieces, said frangible structure comprising a generally flat shear washer member having an outer diameter larger than that of said receiving bore, said bearing washer having a counterbore at its inner end of an axial depth and diameter to generally matingly receive said shear washer member, said shear washer member partially blocking said receiving bore to thereby define with said receiving bore a shear section, said shear section defining said preselected shear area by a preselected thickness and adapted to collapse in shear at said third magnitude of relative axial force applied thereto by said first sleeve shank portion.

6. A blind fastener for securing a plurality of workpieces at a desired final clamp load with the workpieces having aligned openings therein having an accessible side surface and a blind side surface and adapted to be installed by a relative axial force resulting from torque applied by an installation tool from the accessible side surface of the workpieces with the final clamp load being attained by a relative axial force of a first magnitude, said fastener comprising:

a pin member having an elongated pin shank terminating at one end in an enlarged pin head;

said pin shank having a helical thread form extending over a threaded portion at its end opposite said pin head, said pin shank having a splined end portion adapted to be engaged by the installation tool, said splined end portion having axially entending splines defined by ridges entending radially from spline roots, said helical thread form entending across said splined end portion with the major and minor diameters of said spline roots being compatible with the major and minor diameters of said threaded portion whereby said nut member can be threaded thereacross, a nut member having an internal mating thread form adapted to be threaded onto said threaded portion of said pin shank and including an engaging portion adapted to be engaged by the installation tool, engaging means including said nut member for engaging the accessible side surface of the workpieces in load bearing relationship;

said engaging portion on said nut and said splined end portion on said pin shank adapted to be simultaneously engaged by the installation tool whereby torque can be applied between said pin member and said nut member resulting in a relative axial force between said pin member and said nut member, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, said second sleeve portion being radially deformable at a location between said pin head and the blind side surface of the workpieces in response to the relative axial force of a second magnitude less than said first magnitude to form an enlarged blind head for reacting against the blind side surface, said sleeve means including collapsible means adapted to collapse at a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said pin head having a first engaging surface on its underside, said second sleeve portion having a second engaging surface in confrontation with said first engaging surface of said pin head, said first engaging surface having an axially extending projection means adapted to engage said second engaging surface and to inhibit relative rotation between said pin member and said second sleeve portion in response to torque applied by the installation tool, said projection means comprising a plurality of axially entending projections circumferentially disposed about said first engaging surface on said pin head, said pin head being of a substantially higher hardness than that of said second engaging surface on said second sleeve portion whereby said projections can be readily embedded into said second engaging surface to inhibit such relative rotation, said projections located radially inwardly from the radially outer end of said first engaging surface and adapted to engage said second engaging surface at a location radially spaced from the radially inner and outer ends of said second engaging surface, said projections being generally arcuately shaped whereby stress risers at said pin head in the area of said projections and at the portions of said second engaging surface engaged by said projections are avoided.

7. The blind fastener of claim 6 with said pin shank having an annular breakneck groove located between said pinhead and said splined end portion, said breakneck groove having a diameter no greater than the diameter of the root of said helical thread form on said pin shank whereby said nut member can be threaded over said breakneck groove, said breakneck groove adapted to fracture at a preselected magnitude of torque applied by the installation tool.

8. The blind fastener of claim 6 with said pin shank having a relief groove located at the juncture of said splined end portion and the remainder of said threaded portion, said pin shank having an annular breakneck groove located within said remainder of said threaded portion, said breakneck groove and said relief groove having diameters no greater than the diameter of the root of said helical thread form on said pin shank whereby said nut member can be threaded over said breakneck groove and said relief groove, said breakneck groove adapted to fracture at a preselected magnitude of torque applied by the installation tool which preselected magnitude is less than that at which said relief groove would fracture.

9. A blind fastener for securing a plurality of workpieces at a desired clamp load with the workpieces having aligned openings therein and having an accessible side surface and a blind side surface and adapted to be installed by a relative axial force resulting from torque applied by an installation torque tool from the accessible side surface of the workpieces, said blind threaded fastener adapted to be installed by the same installation tool as can be used to install a conventional non-blind fastener in workpieces having aligned openings of the same diameter as the aligned openings in the workpieces to be secured by said blind fastener, said blind fastener comprising:

a pin member having an elongated pin shank terminating at one end in an enlarged pin head;

said pin shank having a helical thread form extending over a threaded portion at its end opposite said pin head, a nut member having an internal mating thread form adapted to be threaded onto said threaded portion of said pin shank and including an engaging portion adapted to be engaged by the installation tool, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, said pin shank having a splined end portion adapted to be engaged by the installation tool, said splined end portion having axially extending splines defined by ridges extending radially from spline roots, said splined end portion having at least three of said spline ridges, said helical thread form extending across said splined end portion with the major and minor diameters of said spline ridges and roots, said spline ridges being of a major diameter generally equal to the major diameter of the crests of said helical thread and said spline roots having a diameter generally no greater than the minor diameter of said helical thread whereby said splined end portion is compatible with said helical thread whereby said nut member can be threaded thereacross, said engaging portion on said nut and said splined end portion on said pin shank adapted to be simultaneously engaged by the installation tool whereby torque can be applied between said pin member and said nut member resulting in a relative axial force between said pin member and said nut member to clamp the workpieces together at a relative axial force of a first magnitude, said pin head having a first engaging surface on its underside, said second sleeve portion having a second engaging surface in confrontation with said first engaging surface of said pin head, axially extending projection means operatively connected with said first and second engaging surfaces for inhibiting relative rotation between said pin member and said second sleeve portion in response to torque applied by said installation torque tool, said second sleeve portion being radially deformable at a location between said pin head and the blind side surface of the workpieces in response to the relative axial force of a second magnitude less than said first magnitude to form an enlarged blind head for reacting against the blind side surface, said blind head adapted to engage the blind side surface such that said first magnitude of relative axial force and the final clamp load applied to the workpieces will be substantially between said pin, said blind head and said nut member, said blind fastener adapted to be installed in aligned openings having a diameter generally the same as aligned openings in workpieces adapted to be secured together by the conventional bolt and nut of the conventional non-blind fastener with the conventional bolt having a shank with a threaded portion compatible with the associated aligned openings and with the bolt shank having a conventional splined end portion of a reduced diameter to freely receive the conventional nut without inference with the internal threads therein, the conventional nut and bolt adapted to be installed by a conventional torque applying installation tool having a first enlarged cavity of a diameter and shape to matingly receive the outer surface of the conventional nut and an inner cavity having a splined construction adapted to matingly receive the conventional splined portion of reduced diameter, said first sleeve shank portion of said blind fastener being of an outside diameter generally the same as that of the conventional bolt shank of the non-blind fastener with said threaded splined end portion of said pin shank having a spline configuration substantially the same diameter and shape as that of the conventional splined end portion and with said nut member of said blind fastener having an outer diameter and shape generally the same as that of the conventional nut whereby said blind fastener can be installed by the same torque applying installation tool as the conventional bolt and nut of the conventional non-blind fastener.

10. The blind fastener of claim 9 with said projection means comprising a plurality of axially extending projections circumferentially disposed about said first engaging surface on said pin head, said pin head being of a substantially higher hardness than that of said second engaging surface on said second sleeve portion whereby said projections can be readily embedded into said second engaging surface to inhibit such relative rotation, said projections located radially inwardly from the radially outer end of said first engaging surface and adapted to engage said second engaging surface at a location radially spaced from the radially inner and outer ends of said second engaging surface, said projections being generally arcuately shaped whereby stress risers at said pin head in the area of said projection and at the portions of said second engaging surface engaged by said projections are avoided.

11. A blind bolt for securing a plurality of workpieces at a desired final clamp load with the workpieces having aligned openings therein and having an accessible side surface and a blind side surface and adapted to be installed by a relative axial force resulting from torque applied by an installation tool from the accessible side surface of the workpieces with the final clamp load being attained by a relative axial force of a first magnitude, said blind bolt comprising:

a pin member having an elongated pin shank terminating at one end in an enlarged pin head;

said pin shank having a helical thread form extending over a threaded portion at its end opposite said pin head, said pin shank having a torque drive end portion adapted to be engaged by the installation tool, a nut member having an internal mating thread form adapted to be threaded onto said threaded portion of said pin shank and including an engaging portion adapted to be engaged by the installation tool, engaging means including said nut member for engaging the accessible side surface of the workpieces in load bearing relationship, said engaging portion on said nut and said drive end portion on said pin shank adapted to be simultaneously engaged by the installation tool whereby torque can be applied between said pin member and said nut member resulting in a relative axial force between said pin member, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, said second sleeve portion being radially deformable at a location between said pin head and the blind side surface of the workpieces in response to the relative axial force of a second magnitude less than said first magnitude to form an enlarged blind head for reacting against the blind side surface, said sleeve means including collapsible means adapted to collapse at a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said pin head having a first engaging surface on its underside, said second sleeve portion having a second engaging surface in confrontation with said first engaging surface of said pin head, said first engaging surface having axially extending projection means adapted to engage said second engaging surface and to inhibit relative rotation between said pin member and said second sleeve portion in response to torque applied by the installation tool, at least one of said pin head and said second sleeve portion having an anti-corrosive protective coating applied thereto whereby the friction between said first engaging surface and said second engaging surface is reduced, said pin head being of a substantially higher hardness than that of said second engaging surface whereby said projection means can be readily embedded into said second engaging surface to inhibit such relative rotation, said projection means comprising a plurality of axially entending projections circumferentially disposed about said first engaging surface on said pin head, said projections located radially inwardly from the radially outer end of said first engaging surface and adapted to engage said second engaging surface at a location radially spaced from the radially inner and outer ends of said second engaging surface, said projections being generally arcuately shaped, whereby stress risers at said pin head in the area of said projections and at the portion of said second engaging surface engaged by said projections are avoided.

* * * * *

UNITED STATES PATENT AND TRADEMARK OFFICE
CERTIFICATE OF CORRECTION

PATENT NO. : 5,651,649
DATED : July 29, 1997
INVENTOR(S) : S. M. Sadri, M. R. Plunkett & M. R. Hicks It is certified that error appears in the above-indentified patent and that said Letters Patent is hereby corrected as shown below:

Title page, item [56]
In the References Cited:

2,324,142  7/1943  "Becklund" should be --Ecklund--

Col. 3, line 16, "2,026,629" should be --2,061,629--.

Col. 14, line 20, "'852 Dixon patent" should be --U.S. Patent No. 5,090,852, issued February 25, 1992 to Dixon--.

Col. 18, line 43, Claim 6 "entending" should be --extending--.

Col. 18, line 44, Claim 6 "entending" should be --extending--.

Col. 18, line 45, Claim 6 "entending" should be --extending--.

Col. 19, line 32, Claim 6 "entending" should be --extending--.

Signed and Sealed this

FourthDay of August, 1998

Attest:

BRUCE LEHMAN

Attesting Officer

Commissioner of Patents and Trademarks